(12) United States Patent
Shigemoto et al.

(10) Patent No.: US 8,276,273 B2
(45) Date of Patent: Oct. 2, 2012

(54) METHOD FOR REMOVING BLADE RING AND MEMBER FOR REMOVING BLADE RING

(75) Inventors: Katsuhisa Shigemoto, Takasago (JP); Taichi Ozaki, Takasago (JP); Hitoshi Morimoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 461 days.

(21) Appl. No.: 12/529,621

(22) PCT Filed: Oct. 23, 2007

(86) PCT No.: PCT/JP2007/070663
§ 371 (c)(1), (2), (4) Date: Nov. 15, 2009

(87) PCT Pub. No.: WO2090/054050
PCT Pub. Date: Apr. 30, 2009

(65) Prior Publication Data
US 2010/0083499 A1 Apr. 8, 2010

(51) Int. Cl.
*B23P 6/00* (2006.01)
*B23P 11/00* (2006.01)

(52) U.S. Cl. ........... 29/889.1; 29/402.03; 29/525.02

(58) Field of Classification Search ........... 29/281.1, 29/402.03, 525.02, 700, 889.1
See application file for complete search history.

(56) References Cited

U.S. PATENT DOCUMENTS

| | | | |
|---|---|---|---|
| 3,493,212 A * | 2/1970 | Scalzo et al. | 415/127 |
| 5,233,822 A * | 8/1993 | Ward et al. | 60/772 |
| 5,913,658 A | 6/1999 | Sexton et al. | |
| 6,079,943 A | 6/2000 | Sexton et al. | |
| 6,224,332 B1 | 5/2001 | Leach et al. | |
| 7,617,602 B2 * | 11/2009 | Dupin et al. | 29/889.1 |

FOREIGN PATENT DOCUMENTS

| | | |
|---|---|---|
| JP | 03-067002 A | 3/1991 |
| JP | 2000-356108 A | 12/2000 |
| JP | 2004-116379 B2 | 4/2004 |

OTHER PUBLICATIONS

Chinese Office Action for Application No. 200780051648.X mailed Jun. 23, 2011.
ISR for PCT/JP2007/070663 dated Jan. 22, 2008.
JPO Office Action for JP2009-537854, mailed May 25, 2011.

* cited by examiner

*Primary Examiner* — Alexander P Taousakis
(74) *Attorney, Agent, or Firm* — Kanesaka Berner & Partner LLP

(57) ABSTRACT

There are provided a method for removing a blade ring by pulling out the blade ring smoothly and surely while preventing damage to other components, and a member for removing a blade ring. By using a dummy blade ring, connection plates, and connecting bolts, work for removing and mounting a lower half section of the blade ring is performed. Thereby, work of rotation and the like can be performed while the lower half section of the blade ring and the dummy blade ring are connected to each other in both end portions. Therefore, during the work, the lower half section of the blade ring and the dummy blade ring are prevented from shifting from each other and therefore from interfering with the opposed rotor blade tip, a lower half section of a casing, and the like, thus preventing damage to the tip, distortion of the lower half section of the blade ring and the dummy blade ring, and the like. Consequently, a stator blade ring can be pulled out smoothly and surely.

4 Claims, 7 Drawing Sheets

METHOD FOR REMOVING BLADE RING AND MEMBER FOR REMOVING BLADE RING

RELATED APPLICATIONS

The present application is based on, and claims priority from, International Application Number PCT/JP2007/070663, filed Oct. 23, 2007, the disclosure of which is hereby incorporated by reference herein in its entirety.

TECHNICAL FIELD

The present invention relates to a method for removing a blade ring and a member for removing a blade ring, which method and member are suitable for being used when a blade ring of a gas turbine and a steam turbine is pulled out of a housing.

BACKGROUND ART

In a gas turbine and a steam turbine, maintenance of parts is accomplished regularly or as necessary.

In the maintenance of a blade ring constituting a compressor for the gas turbine and the steam turbine, the upper half section of a turbine housing having a two-piece construction divided into upper and lower sections is removed, and then the blade ring is pulled out of the lower half section of the turbine housing.

As a specific method for pulling out the blade ring, for example, a method described below is used.

As disclosed in Patent Document 1, the blade ring is made of a two-piece construction divided into upper and lower sections. After the upper half section of a turbine housing has been removed, the upper half section of the blade ring is pulled out. Next, to the lower half section of the blade ring left in the turbine housing, a dummy blade ring is mounted in place of the upper half section of the blade ring. Then, the lower half section of the blade ring and the dummy blade ring are turned round through 180 degrees around the axis. In this state, since the lower half section of the blade ring is in a state of being exposed above from the lower half section of the turbine housing, the lower half section of the blade ring is pulled out.

Patent Document 1: Japanese Patent No. 3777440

DISCLOSURE OF THE INVENTION

Problems to be Solved by the Invention

As shown in FIG. 7A, an upper half section (not shown) of a turbine housing 1 is removed. In this state, an upper half section 2a and a lower half section 2b of a blade ring are integrally connected to each other by bolts and nuts 6 in flange parts 4 and 5 at both ends. Then, these bolts and nuts 6 are loosened, and the upper half section 2a of the blade ring is pulled out.

Next, as shown in FIG. 7B, in place of the upper half section 2a of the blade ring, a dummy blade ring 3 is mounted to the lower half section 2b of the blade ring in a lower half section 1a of the turbine housing 1. At this time, the lower half section 2b of the blade ring and the dummy blade ring 3 are connected to each other by the bolt and nut 6 in flange parts 5 and 7 at one end only. Finally, as shown in FIG. 7D, in the state in which the lower half section 2b of the blade ring and the dummy blade ring 3 are turned round through 180 degrees, the lower half section 2b of the blade ring is separated from the dummy blade ring 3, and is pulled out. However, at this time, in the state in which the lower half section 2b of the blade ring and the dummy blade ring 3 are turned round through 180 degrees, the bolt and nut 6 that connect the lower half section 2b of the blade ring and the dummy blade ring 3 to each other enter the lower half section 1a of the turbine housing 1, so that the bolt and nut 6 cannot be removed. To solve this problem, as shown in FIG. 7C, when the lower half section 2b of the blade ring and the dummy blade ring 3 are being rotated, before the flange parts 5 and 7 on the side on which the bolt and nut 6 are installed enter the lower half section 1a of the turbine housing 1, the rotation of the lower half section 2b of the blade ring and the dummy blade ring 3 is interrupted for a while, and the bolt and nut 6 are removed. In this state, since the bolt and nut 6 are exposed above the lower half section 1a of the turbine housing 1, the work for removing the bolt and nut 6 is not hindered. Thereafter, the lower half section 2b of the blade ring and the dummy blade ring 3 are rotated, and as shown in FIG. 7D, in the state in which the lower half section 2b of the blade ring is exposed above from the lower half section 1a of the turbine housing 1, the lower half section 2b of the blade ring is pulled out.

In the above-described method, however, after the bolt and nut 6 have been removed as shown in FIG. 7C, it is necessary to rotate the lower half section 2b of the blade ring and the dummy blade ring 3 to the state shown in FIG. 7D. During this time, the lower half section 2b of the blade ring and the dummy blade ring 3 are not connected (fastened) to each other. Even if only the nut is removed and the bolt is left when the bolt and nut 6 are removed, the lower half section 2b of the blade ring and the dummy blade ring 3 may shift relatively from each other by a clearance between the inside diameter of bolt hole and the outside diameter of bolt. If the lower half section 2b of the blade ring and the dummy blade ring 3 shift from each other, these elements come into contact with the tip of the opposed rotor blade, so that the tip may be damaged.

Also, when the bolt and nut 6 are removed, the lower half section 2b of the blade ring and the dummy blade ring 3 are in an inclined state. Therefore, the shift of the lower half section 2b of the blade ring in this state leaves room for improvement in terms of work safety.

In addition, if the lower half section 2b of the blade ring and the dummy blade ring 3 are rotated in the state in which the bolt and nut 6 have been removed, the lower half section 2b of the blade ring and the dummy blade ring 3 may be distorted by the interference with the turbine housing 1.

The present invention has been made to solve the above technical problems, and accordingly an object thereof is to provide a method for removing a blade ring by pulling out the blade ring smoothly and surely while preventing damage to other components, and a member for removing a blade ring.

Means for Solving the Problems

The present invention made to achieve the above object provides a method for removing a blade ring accommodated in a housing forming the shell of a turbine, including a first step of removing an upper half section of the turbine having a two-piece construction to make the upper portion of a lower half section of the turbine open; a second step of removing an upper half section of the blade ring having a two-piece construction; a third step of connecting a dummy blade ring having almost the same shape as that of the upper half section of the blade ring to a lower half section of the blade ring accommodated in the lower half section of the turbine with a connection member being interposed between the lower half section of the blade ring and the dummy blade ring; a fourth step of rotating the lower half section of the blade ring and the dummy blade ring so that the lower half section of the blade ring projects above from the lower half section of the turbine; and a fifth step of removing the lower half section of the blade ring, which projects above from the lower half section of the turbine, from the dummy blade ring. In the third step, the dummy blade ring and the connection member are connected to each other by a first connecting bolt capable of being rotated from both of the dummy blade ring side and the connection member side, and the connection member and the lower half section of the blade ring are connected to each other by a second connecting bolt. In the fifth step, the dummy blade ring and the connection member are separated from each other by rotating the first connecting bolt from the connection member side, and the lower half section of the blade ring and the connection member are removed from the dummy blade ring.

Thus, if the connection member is interposed between the lower half section of the blade ring and the dummy blade ring, the dummy blade ring and the connection member are connected to each other by the first connecting bolt capable of being rotated from both of the dummy blade ring side and the connection member side, and the connection member and the lower half section of the blade ring are connected to each other by the second connecting bolt, in the fifth step, the dummy blade ring and the connection member are separated from each other by rotating the first connecting bolt from the connection member side, and the lower half section of the blade ring and the connection member can be removed from the dummy blade ring while being connected to each other by the second connecting bolt. Thereby, when the lower half section of the blade ring and the dummy blade ring are rotated in the fourth step, the lower half section of the blade ring and the dummy blade ring can be made in a state of being connected to each other by the first connecting bolt and the second connecting bolt.

Also, since the first connecting bolt can be rotated from both of the dummy blade ring side and the connection member side, when the upper half section of the blade ring and the dummy blade ring are connected to each other in the third step, the first connecting bolt can be rotated from the dummy blade ring side on which the dummy blade ring is exposed above from the lower half section of the turbine, and when the dummy blade ring and the connection member are separated from each other in the fifth step, the first connecting bolt can be rotated from the connection member side on which the connection member is exposed above from the lower half section of the turbine.

When the dummy blade ring and the connection member are connected to each other by the first connecting bolt in the third step, the first connecting bolt is screwed into holes formed in the dummy blade ring and the connection member from the dummy blade ring side so that a tip end portion of the first connecting bolt projects from the connection member, and when the first connecting bolt is rotated from the connection member side in the fifth step, the tip end portion of the first connecting bolt, which is machined so as to be capable of being rotated by using a predetermined tool, is rotated by using the tool.

As for the second connecting bolt, although a dedicated bolt may be prepared, a bolt used for connecting the upper half section of the blade ring to the lower half section of the blade ring can be used as it is.

In this case, when the connection member and the lower half section of the blade ring are connected by the second connecting bolt in the third step, it is preferable that a nut used for connecting the upper half section of the blade ring to the lower half section of the blade ring be used, and a tubular collar having a height determined based on the thickness of a flange part of the upper half section of the blade ring and the thickness of the connection member be interposed between the nut and the connection member.

The present invention also provides a member for removing a blade ring, wherein the member is used to remove a lower half section of the blade ring having a two-piece construction accommodated in a housing forming the shell of a turbine, from the housing. This member for removing a blade ring includes a dummy blade ring which has almost the same shape as that of an upper half section of the blade ring and is connected to the lower half section of the blade ring accommodated in a lower half section of the turbine; a connection member interposed between the lower half section of the blade ring and the dummy blade ring; and a connecting bolt which connects the dummy blade ring and the connection member to each other and can be rotated from both of the dummy blade ring side and the connection member side.

Such a member for removing a blade ring can be used for the above-described method for removing a blade ring.

Advantageous Effects of the Invention

According to the present invention, by using the connection member and the first connecting bolt, the work for removing and mounting the lower half section of the blade ring is performed. Thereby, the work of rotation and the like can be performed while the lower half section of the blade ring and the dummy blade ring are connected to each other. Therefore, during the work, the lower half section of the blade ring and the dummy blade ring are prevented from shifting from each other and therefore from interfering with the opposed rotor blade tip, the lower half section of the casing, and the like, thus preventing damage to the tip, distortion of the lower half section of the blade ring and the dummy blade ring, and the like. Consequently, the stator blade ring can be pulled out smoothly and surely.

DESCRIPTION OF SYMBOLS

20 . . . gas turbine (turbine), 32 . . . stator blade ring, 34 . . . upper half section of blade ring, 34a . . . flange part, 35 . . . lower half section of blade ring, 35a . . . flange part, 40 . . . bolt (second connecting bolt), 41 . . . nut, 50 . . . casing, 53 . . . lower half section of casing, 60 . . . dummy blade ring, 60*a* . . . flange part, 61 . . . connection plate (connection member), 70 . . . connecting bolt (first connecting bolt), 70*c* . . . tip end part, 80 . . . collar

BEST MODE FOR CARRYING OUT THE INVENTION

The present invention will now be described in detail based on an embodiment shown in the accompanying drawings.

Figure 1:
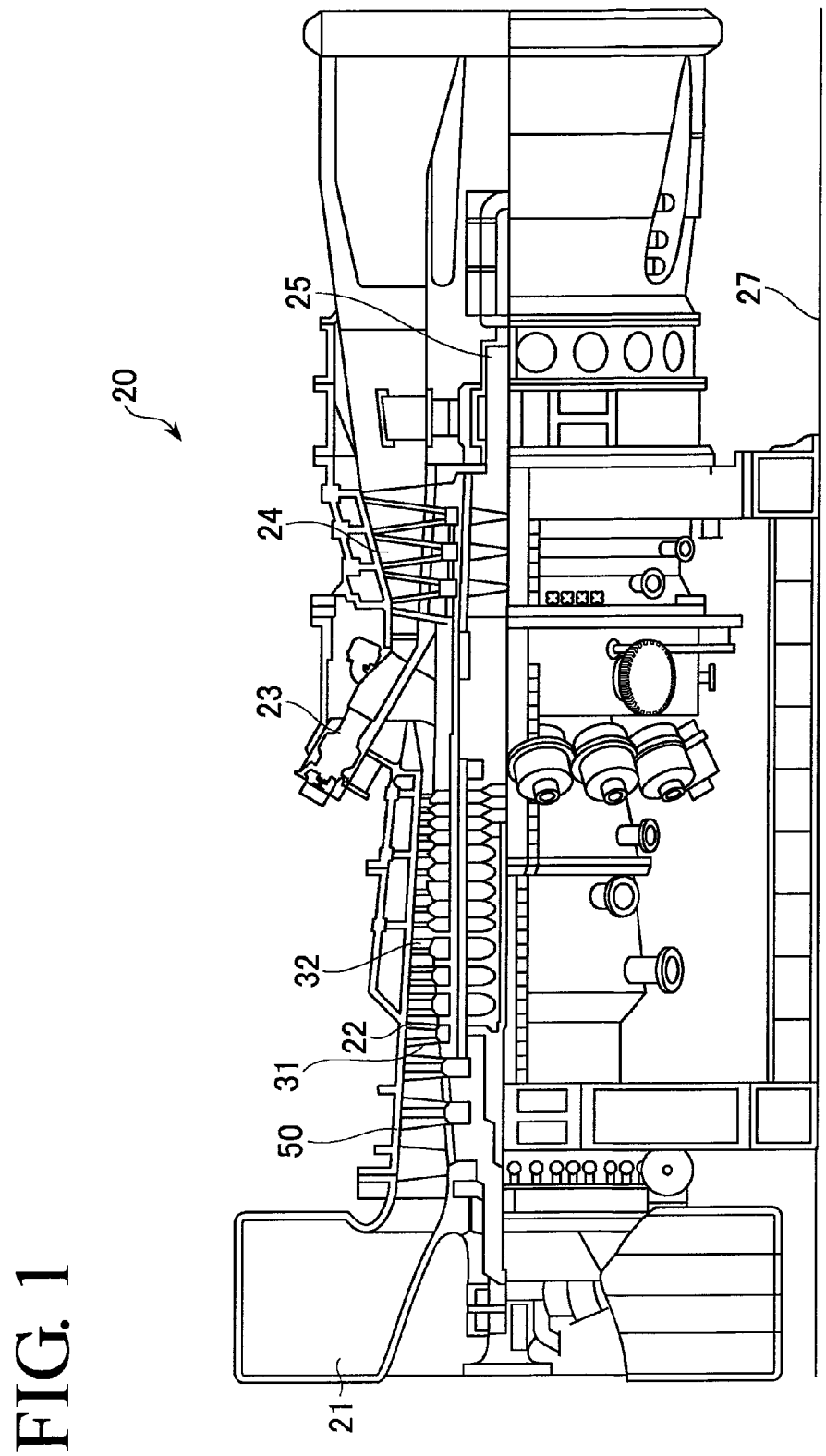
FIG. 1 is a view showing a general configuration of a gas turbine in the present embodiment.

FIG. 1 is a view for explaining the general configuration of a gas turbine (turbine) in this embodiment.

As shown in FIG. 1, a gas turbine 20 is provided with an air intake 21, a compressor 22, a combustor 23, and a turbine 24 arranged from the upstream side toward the downstream side of an air flow. Equipment constituting the gas turbine 20 including the compressor 22, the combustor 23, and the turbine 24 is covered with a casing 50.

Air taken in from the air intake 21 is compressed by the compressor 22, and is sent into the combustor 23 as high temperature and pressure compressed air. In the combustor 23, a gas fuel such as natural gas or a liquid fuel such as light oil or light-heavy oil is supplied to the compressed air, and the fuel is burned to produce a high temperature and pressure combustion gas. This high temperature and pressure combustion gas is injected into the turbine 24, and expands in the turbine 24 to rotate the turbine 24. By the rotational energy of the turbine 24, a generator or the like connected to a main shaft 25 of the gas turbine 20 is driven.

The compressor 22 is an axial flow compressor in which rotor blade rings 31 and stator blade rings 32 are arranged alternately in the axial direction of a rotating shaft.

Figure 2A:
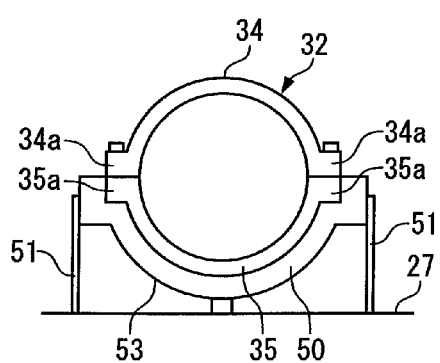
FIGS. 2A, 2B, 2C and 2D are views showing a flow of a method for removing a blade ring in accordance with the present invention.
Figure 3:
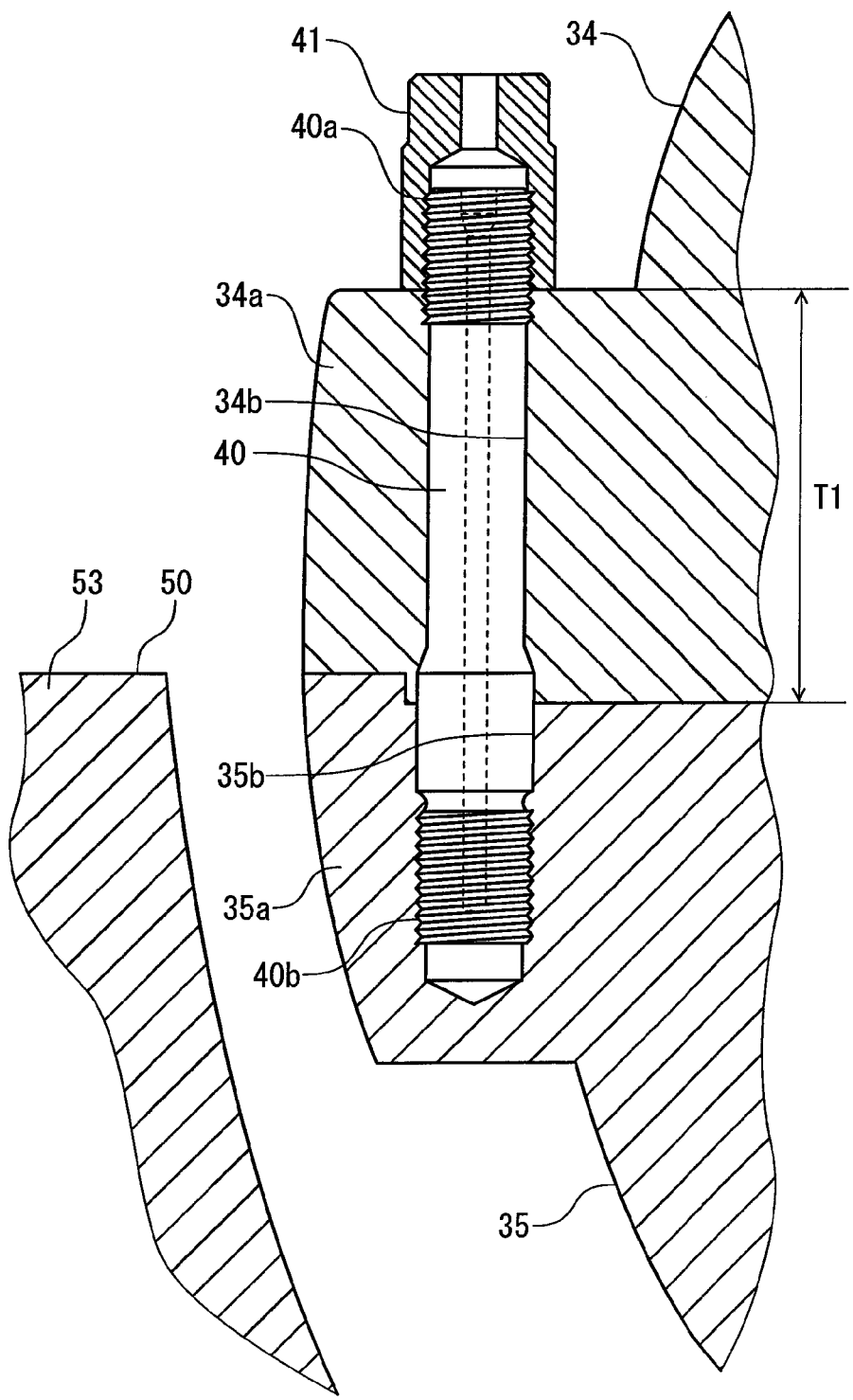
FIG. 3 is a sectional view showing a state in which the upper half section of a casing has been removed.

As shown in FIG. 2A, the stator blade ring 32 has a construction dividable into two upper and lower sections, and is formed by combining a semicircular arc shaped upper half section 34 of the blade ring with a semicircular arc shaped lower half section 35 of the blade ring. As shown in FIG. 3, the upper half section 34 of the blade ring and the lower half section 35 of the blade ring are respectively provided with flange parts 34*a* and 35*a*, which project to the outer periphery side, in both end portions thereof. The upper half section 34 of the blade ring and the lower half section 35 of the blade ring are connected to each other by fastening nuts 41 to bolts (second connecting bolts) 40 inserted into bolt holes 34*b* and 35*b* formed in the flange parts 34*a* and 35*a* in the state in which the flange parts 34*a* and 35*a* are abutted against each other, and are integrated with each other.

As shown in FIG. 2A, a casing 50 is supported by support legs 51 provided on a base 27.

The casing 50 has a construction dividable into two upper and lower sections, and is formed by combining an upper half section (not shown) of the casing having a semicircular arc shaped inside diameter shape with a lower half section 53 of the casing having a semicircular arc shaped inside diameter shape. The upper half section (not shown) of the casing and the lower half section 53 of the casing are respectively provided with flange parts, which project to the outer periphery side, in both end portions thereof. The upper half section (not shown) of the casing and the lower half section 53 of the casing are connected to each other by fastening bolts and nuts (not shown) in the state in which the flange parts are abutted against each other, and are integrated with each other. The upper half section (not shown) of the casing and the lower half section 53 of the casing are provided so as to abut against each other at the same level as the center axis of the main shaft 25.

The maintenance of the above-described stator blade ring 32 of the gas turbine 20 is accomplished as described below.

[First Step]

First, as shown in FIG. 2A, in the flange parts of the upper half section (not shown) of the casing and the lower half section 53 of the casing, the bolts and nuts (not shown) are removed, and the upper half section (not shown) of the casing is removed by being lifted by using a hoist type crane or the like. Thereby, the upper portion of the lower half section 53 of the casing is made open, and the upper half section 34 of the blade ring and the like are exposed in a state of projecting above from the upper surface of the lower half section 53 of the casing.

[Second Step]

Next, in the flange parts 34*a* at both ends of the upper half section 34 of the blade ring exposed from the upper surface of the lower half section 53 of the casing, the nuts 41 are removed from head parts 40*a* of all the bolts 40.

Then, the upper half section 34 of the blade ring is removed by being lifted by using a hoist type crane or the like. In this state, the lower half section 35 of the blade ring remains in the lower half section 53 of the casing, and in the flange parts 35*a* at both ends of the lower half section 35 of the blade ring, the head parts 40*a* of the bolts 40 project above. This bolt 40 is formed with spiral threads in the outer peripheral portion of a base part 40*b* thereof, and is screwed into the bolt hole 35*b* formed in the flange part 35*a*.

[Third Step]

Figure 2B:
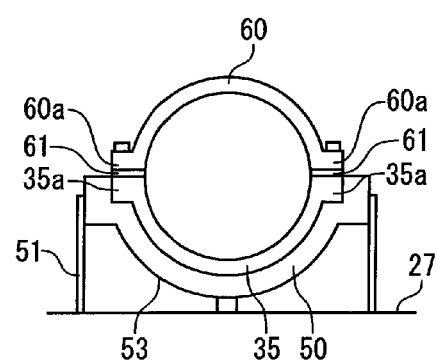

Successively, as shown in FIG. 2B, a dummy blade ring 60 and connection plates (connection members) 61 are mounted to the flange parts 35*a* of the lower half section 35 of the blade ring.

The dummy blade ring 60 has the same external shape as that of the upper half section 34 of the blade ring except for a flange part 60*a*.

Figure 4:
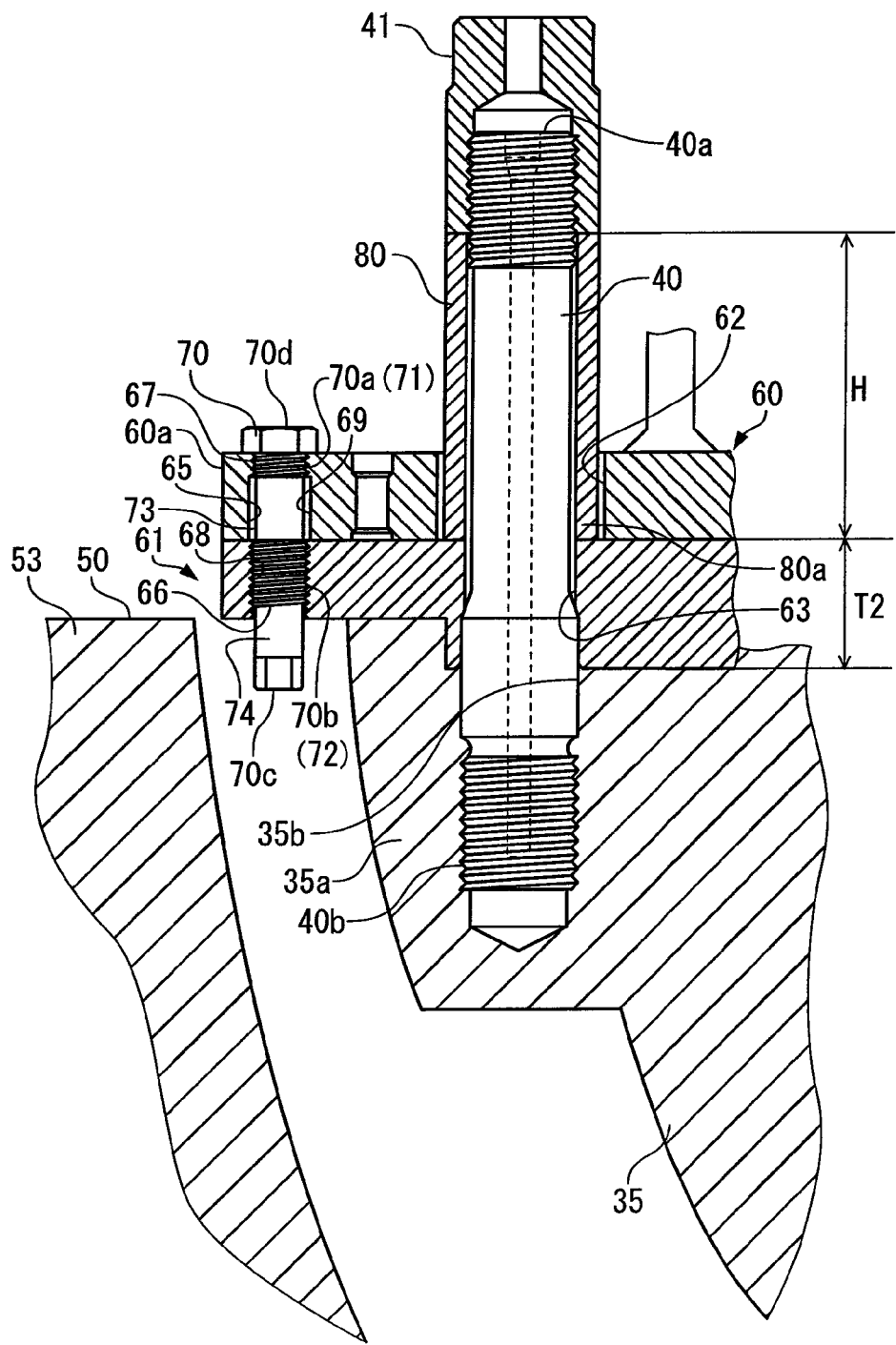
FIG. 4 is a sectional view showing a state in which a dummy blade ring is attached.

As shown in FIG. 4, the connection plate 61 is provided so as to be interposed between the flange part 60*a* of the dummy blade ring 60 and the lower half section 35 of the blade ring.

The flange part 60*a* of the dummy blade ring 60 and the connection plate 61 are respectively formed with through holes 62 and 63 through which the head part 40*a* of the bolt 40 projecting above from the lower half section 35 of the blade ring is inserted. The through hole 62 formed in the flange part 60*a* of the dummy blade ring 60 is formed so that the inside diameter thereof is larger than that of the through hole 63 formed in the connection plate 61.

The flange part 60*a* of the dummy blade ring 60 and the connection plate 61 are formed so as to project to the outer periphery side of blade ring beyond the flange part 35*a* of the lower half section 35 of the blade ring, and are connected to each other by a connecting bolt (first connecting bolt) 70 in the portion projecting to the outer periphery side of blade ring beyond the flange part 35*a* of the lower half section 35 of the blade ring.

The connecting bolt 70 is formed with threads 71 and 72 in the outer peripheral portions of a base part 70*a* and an intermediate part 70*b*, respectively. In the connecting bolt 70, a part 73 between the threads 71 and the threads 72 and a part 74 on the tip end part 70*c* side of the threads 72 are formed so as to have an outside diameter smaller than the outside diameters of the threads 71 and 72. Further, the tip end part 70*c* of the connecting bolt 70 is machined into a predetermined cross sectional shape such as a hexagonal shape so that the connecting bolt 70 can be rotated by using a predetermined tool.

On the other hand, in the flange part 60*a* of the dummy blade ring 60 and the connection plate 61, through holes 65 and 66 are formed, respectively. In the inner peripheral surfaces of the through holes 65 and 66, threaded grooves 67 and 68 are formed, respectively, at positions corresponding to the threads 71 and 72 in the state in which the connecting bolt 70 has been screwed completely. Also, the through hole 65 of the flange part 60a is formed on the opposite side to the side on which the threaded groove 68 faces to the connection plate 61, and a part 69 on the side facing to the connection plate 61 of the threaded groove 68 is formed so as to have an inside diameter larger than the outside diameter of the threads 72 of the connecting bolt 70.

When the connecting bolt 70 is screwed into the through holes 65 and 66 by using a predetermined tool in a bolt head part 70d, the threads 71 and 72 engage with the threaded grooves 67 and 68, respectively, whereby a fastening force is exerted. Therefore, the flange part 60a of the dummy blade ring 60 and the connection plate 61 are connected to each other.

After the dummy blade ring 60 and the connection plate 61 have been set on the lower half section 35 of the blade ring, a collar 80 and the nut 41 are installed in the head part 40a of the bolt 40 projecting above from the lower half section 35 of the blade ring. The collar 80 is formed so that the outside diameter thereof is smaller than the diameter of the through hole 62 formed in the flange part 60a of the dummy blade ring 60 and larger than the diameter of the through hole 63 formed in the connection plate 61. Therefore, a lower end part 80a of the collar 80 abuts against the upper surface of the connection plate 61, and the connection plate 61 and the flange part 35a of the lower half section 35 of the blade ring are connected to each other by tightening the nut 41.

The collar 80 is a member for using the nut 41, which is used for the connection between the upper half section 34 of the blade ring and the lower half section 35 of the blade ring, as it is. Therefore, the height H thereof is determined from the thickness T1 of the flange part 34a of the upper half section 34 of the blade ring and the thickness T2 of the connection plate 61 (H≅T1−T2). Needless to say, in place of the collar 80 and the nut 41, a dedicated nut (not shown) can be used.

For the connection between the flange parts 60a of the dummy blade ring 60 and the connection plates 61 using the connecting bolts 70 and the connection between the connection plates 61 and the lower half section 35 of the blade ring using the bolts 40, the collars 80, and the nuts 41, the work sequence is arbitrary.

[Fourth Step]

Figure 2C:
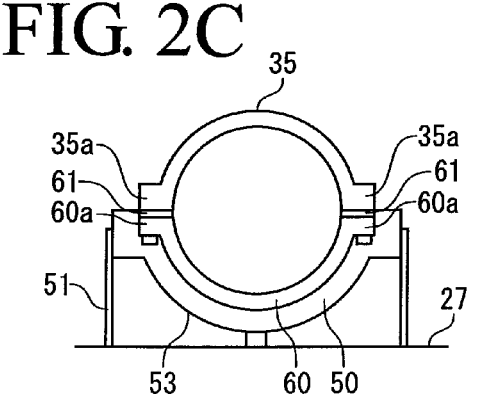

After the dummy blade ring 60 and the lower half section 35 of the blade ring have been connected to each other via the connection plates 61 as described above, as shown in FIG. 2C, an eyebolt (not shown) is attached to the dummy blade ring 60, and the dummy blade ring 60 and the lower half section 35 of the blade ring are rotated by using a chain block or the like. At this time, a pin (not shown) inserted into the lower half section 35 of the blade ring through the lower half section 53 of the casing from the outer periphery side of the lower half section 53 of the casing to position the lower half section 35 of the blade ring to the lower half section 53 of the casing is pulled out beforehand.

When the dummy blade ring 60 and the lower half section 35 of the blade ring are turned upside-down, the dummy blade ring 60 is accommodated in the lower half section 53 of the casing, and the lower half section 35 of the blade ring projects above from the lower half section 53 of the casing, the rotation of the dummy blade ring 60 and the lower half section 35 of the blade ring is stopped.

Figure 5:
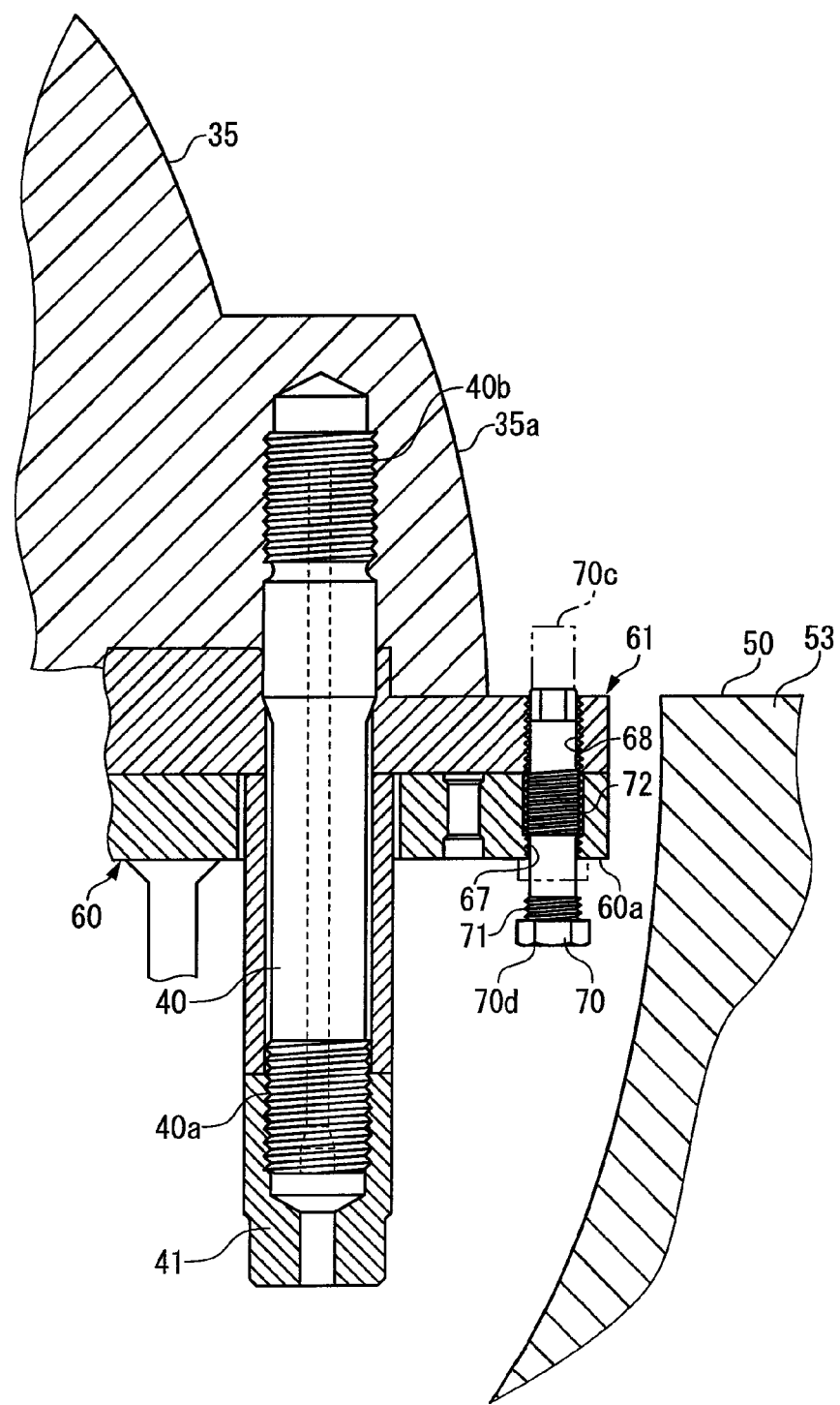
FIG. 5 is a sectional view showing a state in which a dummy blade ring and the lower half section of a blade ring have been rotated through 180 degrees.

As shown in FIG. 5, in this state, above the lower half section 53 of the casing, the flange part 35a of the lower half section 35 of the blade ring is exposed, and further, on the outer periphery side thereof, the tip end part 70c of the connecting bolt 70 projects from the connection plate 61 (the state indicated by the two-dot chain line in FIG. 5).

[Fifth Step]

Next, the tip end part 70c of the connecting bolt 70 is rotated from the connection plate 61 by using the predetermined tool to loosen the connecting bolt 70. The threads 71 of the connecting bolt 70 disengage from the threaded groove 67, and further the threads 72 disengage from the threaded groove 68. Thereby, the connecting bolt 70 is disengaged from the connection plate 61, becoming in a free state. At this time, the downward movement of the connecting bolt 70 is regulated by the interference of the threads 72 with the threaded groove 67, so that the connecting bolt 70 is prevented from dropping into the lower half section 53 of the casing.

Thereby, the connection between the flange part 60a of the dummy blade ring 60 and the connection plate 61 is severed.

Figure 2D:
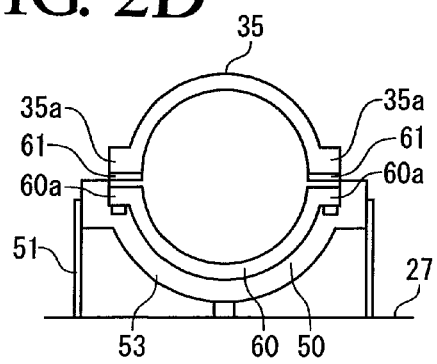
Figure 6:
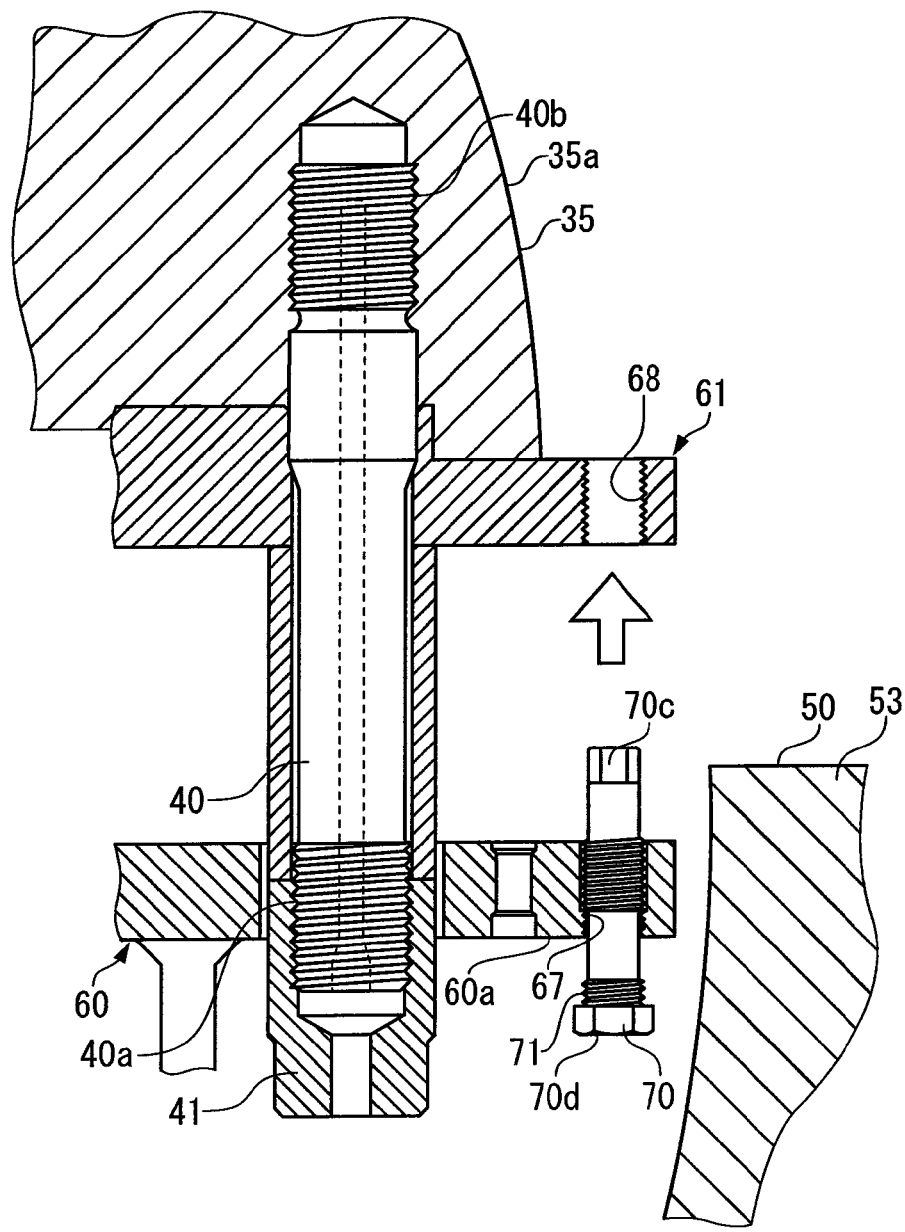
FIG. 6 is a sectional view showing a state in which the lower half section of a blade ring and a connection plate are removed.
Figure 7A:
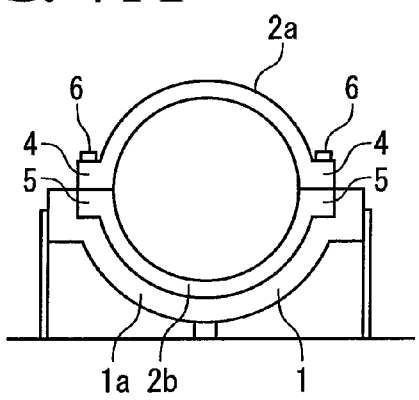
FIGS. 7A, 7B, 7C and 7D are views showing a flow of a conventional method for removing a blade ring.
Figure 7B:
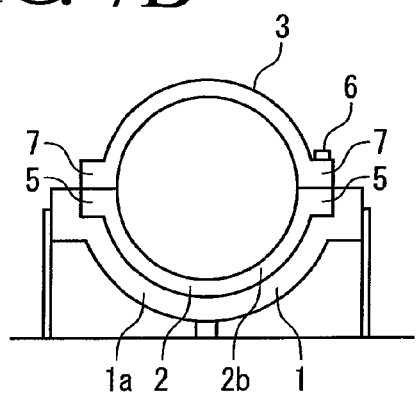
Figure 7C:
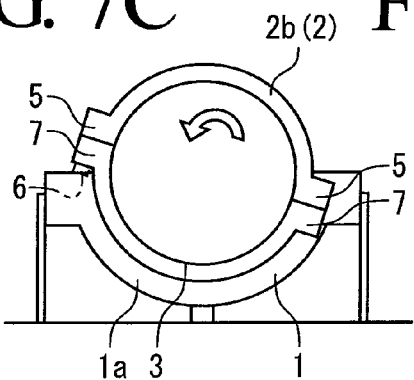
Figure 7D:
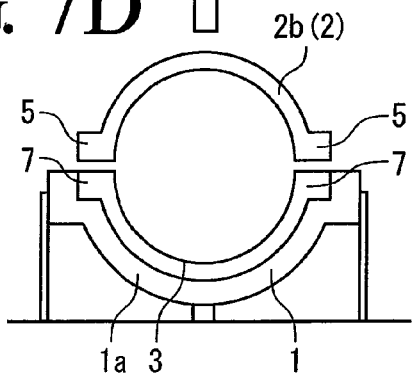

Thereafter, as shown in FIGS. 2D and 6, the lower half section 35 of the blade ring is removed by being lifted by using a hoist type crane or the like. To the lower half section 35 of the blade ring, the connection plates 61 are still connected by using the bolts 40, the collars 80, and the nuts 41.

After the upper half section 34 of the blade ring and the lower half section 35 of the blade ring have been pulled out of the lower half section 53 of the casing, predetermined maintenance of these sections is accomplished. At this time, the connection plates 61 can be removed from the lower half section 35 of the blade ring by removing the nuts 41 and the collars 80.

After the maintenance has been finished, by reversing the above procedure, the connection of the lower half section 35 of the blade ring to the dummy blade ring 60 via the connection plates 61, the turning round of the dummy blade ring 60 and the lower half section 35 of the blade ring, the removal of the dummy blade ring 60, the connection of the lower half section 35 of the blade ring to the lower half section 35 of the blade ring, and the attachment of the upper half section of the casing (not shown) to the lower half section 53 of the casing are performed in consecutive order, whereby the gas turbine 20 can be restored to the original state.

As described above, by using the dummy blade ring 60, the connection plates 61, and the connecting bolts 70 as members for removing the blade ring, the work for removing and mounting the lower half section 35 of the blade ring is performed. Thereby, the work of rotation and the like can be performed while the lower half section 35 of the blade ring and the dummy blade ring 60 are connected to each other in both end portions.

Therefore, during the work, the lower half section 35 of the blade ring and the dummy blade ring 60 are prevented from shifting from each other and therefore from interfering with the opposed rotor blade tip, the lower half section 53 of the casing, and the like, thus preventing damage to the tip, distortion of the lower half section 35 of the blade ring and the dummy blade ring 60, and the like. Consequently, the stator blade ring 32 can be pulled out smoothly and surely.

In the above-described embodiment, the configuration of the gas turbine 20 has been explained. However, other sections of the gas turbine 20, which do not relate to the teachings of the present application, can be configured appropriately.

Also, the present invention can be applied to not only the gas turbine 20 but also a steam turbine.

Besides, the configuration described in the above-described embodiment can be selected or changed to other configurations appropriately without departing from the spirit and scope of the present invention.

The invention claimed is:

1. A method for removing a blade ring accommodated in a housing forming the shell of a turbine, comprising:

a first step of removing an upper half section of the turbine having a two-piece construction to make the upper portion of a lower half section of the turbine open;

a second step of removing an upper half section of the blade ring having a two-piece construction;

a third step of connecting a dummy blade ring having almost the same shape as that of the upper half section of the blade ring to a lower half section of the blade ring accommodated in the lower half section of the turbine with a connection member being interposed between the lower half section of the blade ring and the dummy blade ring;

a fourth step of rotating the lower half section of the blade ring and the dummy blade ring so that the lower half section of the blade ring projects above from the lower half section of the turbine; and a fifth step of removing the lower half section of the blade ring, which projects above from the lower half section of the turbine, from the dummy blade ring, wherein in the third step, the dummy blade ring and the connection member are connected to each other by a first connecting bolt capable of being rotated from both of the dummy blade ring side and the connection member side, and the connection member and the lower half section of the blade ring are connected to each other by a second connecting bolt, and in the fifth step, the dummy blade ring and the connection member are separated from each other by rotating the first connecting bolt from the connection member side, and the lower half section of the blade ring and the connection member are removed from the dummy blade ring.

2. The method for removing a blade ring according to claim 1, wherein when the dummy blade ring and the connection member are connected to each other by the first connecting bolt in the third step, the first connecting bolt is screwed into holes formed in the dummy blade ring and the connection member from the dummy blade ring side so that a tip end portion of the first connecting bolt projects from the connection member, and when the first connecting bolt is rotated from the connection member side in the fifth step, the tip end portion of the first connecting bolt, which is machined so as to be capable of being rotated by using a predetermined tool, is rotated by using the tool.

3. The method for removing a blade ring according to claim 1, wherein the second connecting bolt is a bolt used for connecting the upper half section of the blade ring to the lower half section of the blade ring.

4. The method for removing a blade ring according to claim 3, wherein when the connection member and the lower half section of the blade ring are connected to each other by the second connecting bolt in the third step, a nut used for connecting the upper half section of the blade ring to the lower half section of the blade ring is used, and a tubular collar having a height determined based on the thickness of a flange part of the upper half section of the blade ring and the thickness of the connection member is interposed between the nut and the connection member.

* * * * *